United States Patent
Silverman

(10) Patent No.: US 6,389,113 B1
(45) Date of Patent: May 14, 2002

(54) DUAL-ALERTING PAGING SYSTEM AND MONITORING OF RETURN CALL

(75) Inventor: David P. Silverman, Somerville, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/440,952

(22) Filed: Nov. 16, 1999

(51) Int. Cl.[7] .......................... H04M 1/24; H04M 3/08; H04M 3/22

(52) U.S. Cl. .............................. 379/35; 379/7; 379/229; 379/230; 379/133

(58) Field of Search .............................. 379/7, 35, 111, 379/133–134, 127.01, 201.01, 229–230, 202.01, 207.15

(56) References Cited

U.S. PATENT DOCUMENTS

| | | | |
|---|---|---|---|
| 5,307,399 A | * | 4/1994 | Dai et al. |
| 5,590,171 A | * | 12/1996 | Howe et al. |
| 5,706,329 A | | 1/1998 | Foladare et al. |
| 5,881,132 A | * | 3/1999 | O'Brien et al. |
| 6,097,798 A | * | 8/2000 | Albers et al. |

* cited by examiner

*Primary Examiner*—Duc Nguyen
(74) *Attorney, Agent, or Firm*—Mendelsohn and Associates PC

(57) ABSTRACT

A technique for monitoring the calls placed to the telephone number associated with the party under surveillance. When a call to the telephone number associated with party under surveillance is placed, the call is routed via an assigned meet-me bridge, and a third party is provided with the unique telephone number of the meet-me bridge via a pager. When the third party places a call to the assigned meet-me bridge, the incoming call to the party under surveillance and the call by the third party are bridged. Thereon, the third party is placed on mute and the third party may silently listen to the conversation between the caller and the called party. When a call (i.e., a page) to a telephone number associated with a pager of the party under surveillance is received, a third party is alerted. Also, in response to the page, when the party under surveillance uses a specific calling card to place a return call, the return call is routed via a meet-me bridge having a unique number, and the third party is provided with this unique number. When the third party places a call to this unique number, that call is routed to the assigned meet-me bridge, and the return call and the call by the third party are bridged. Thereon, the third party is placed on mute and the third party may listen to the return call conversation.

7 Claims, 4 Drawing Sheets

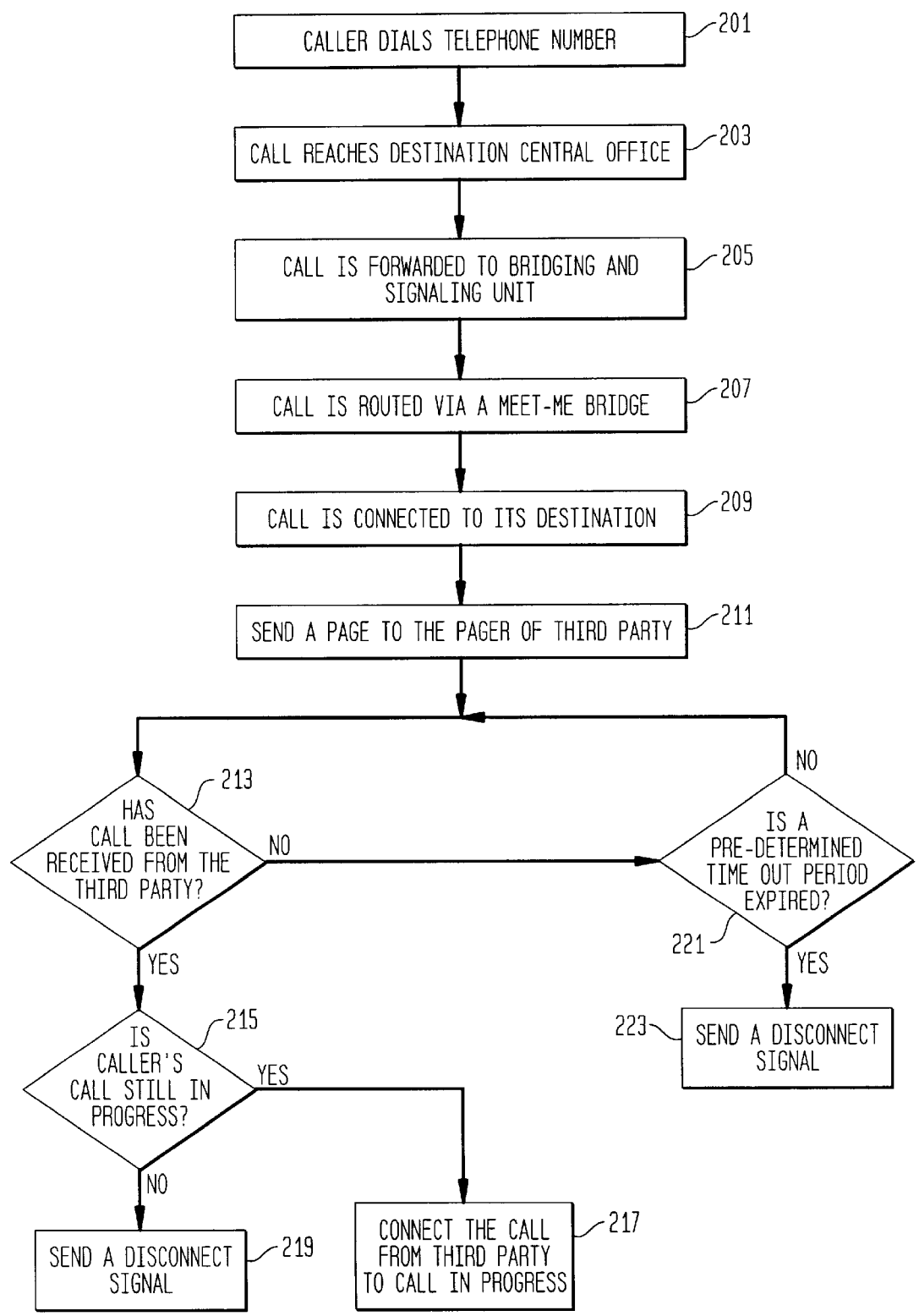

DUAL-ALERTING PAGING SYSTEM AND MONITORING OF RETURN CALL

BACKGROUND OF THE INVENTION

1. Field of the Invention

The present invention generally relates to telecommunications systems, and more particularly to a method and apparatus for monitoring selected telecommunications sessions.

2. Background of the Invention

Since the invention of the telephone and pervasive use of telecommunications for exchanging information and conducting business, there has been a recognized need by private industry and government authorities for an ability to monitor selected telecommunications sessions.

Government agencies, in particular law enforcement agencies routinely monitor selected telecommunications sessions in order to acquire information important in the maintenance of law and order. Since sophisticated tools are commercially available to permit the detection of monitoring equipment, law enforcement agencies require monitoring facilities that are difficult or impossible to detect in order to ensure that acquired information is accurate and indicative of information that would be exchanged in confidentiality.

Private industry also routinely monitors selected telecommunications sessions, in particular voice communications, to evaluate the effectiveness of sales and customer service personal to ensure that clients and/or potential clients receive adequate and courteous service in an attempt to maintain and increase market share. Because so many business transactions are now conducted by telephone, it is imperative that commercial operations have the ability to monitor their staff in an unobtrusive and undetectable fashion in order to ensure that an accurate evaluation of attitudes and performance is obtained.

Selective monitoring of telecommunications is also conducted by parents in order to supervise their children and/or domestic help in a household environment. Since this type of monitoring is for the purpose of supervision by private individuals, low-cost monitoring tools are desired.

Generally, prior art systems for monitoring selected telecommunications sessions require that a "tap" consisting of a mechanical connection or bridge to monitoring equipment be attached to a telephone line to be monitored. This art of mechanical "tapping" into a monitored line is generally accomplished at a local telephone switch within the public switched telephone network or in a private branch exchange.

A disadvantage of such prior art monitoring equipment is that it changes the impedance of the monitored line which is readily detectable. Another disadvantage is that a great deal of time and effort is required to install such a monitoring connection.

There is also a significant disadvantage in the lack of flexibility because the monitoring equipment is not readily switched from line to line. If, for example, a person owns a land-based telephone line, a mobile line, and a modem line, a prior art tap must be connected to each line.

The problem is further exacerbated if the caller calls a telephone number associated with the pager owned by the called party, and the actual telecommunications session is established when the called party returns the call. In those instances, there is no practical solution for monitoring telecommunications sessions using such prior art equipment.

SUMMARY OF THE INVENTION

The present invention is directed to a technique for monitoring the calls placed to the telephone number associated with the party under surveillance. When a call to the telephone number associated with party under surveillance is placed, the call is routed via an assigned meet-me bridge, and a third party is provided with the unique telephone number of the meet-me bridge via a pager. When the third party places a call to the assigned meet-me bridge, the incoming call to the party under surveillance and the call by the third party are bridged. Thereon, the third party is placed on mute and the third party may silently listen to the conversation between the caller and the called party.

In an alternative embodiment, a dual-alerting paging system having the capabilities of monitoring the return call is disclosed. When a call (i.e., a page) to a telephone number associated with a pager of the party under surveillance is received, a third party is alerted. Also, in response to the page, when the party under surveillance uses a specific calling card to place a return call, the return call is routed via a meet-me bridge having a unique number, and the third party is provided with this unique number. When the third party places a call to this unique number, that call is routed to the assigned meet-me bridge, and the-return call and the call by the third party are bridged. Thereon, the third party is placed on mute and the third party may listen to the return call conversation.

Thus, the principles of the present invention provide a low cost solution for monitoring incoming calls to a telephone, and incoming pages to a pager. Unlike the prior art, a mechanical tap connected to the physical telephone line is not required.

In one embodiment, the present invention is a method for monitoring a first party under surveillance, comprising the steps of (a) detecting access to telecommunications equipment corresponding to the first party; and (b) automatically generating a paging message to a third party to alert the third party about the access

BRIEF DESCRIPTION OF THE DRAWINGS

Other aspects, features, and advantages of the present invention will become more fully apparent from the following detailed description, the appended claims, and the accompanying drawings in which:

FIG. 2A illustrates a flow chart of an exemplary process of the first embodiment;

DETAILED DESCRIPTION

In a first embodiment, the principles of the present invention may be utilized to monitor incoming calls to an individual's telephone number. Here, as soon as the incoming call is received for the telephone number of the party under surveillance, the incoming call is routed to a "meet-me" bridge. A third party (generally a party monitoring the incoming calls to the called party) is alerted via a pager and supplied with a telephone number corresponding to the assigned meet-me bridge. Upon the receipt of a call from the third party, the third party is interconnected to the call-in-progress (i.e., the call between the calling party and the called party). The third party is thereon placed on mute and may listen to the conversation.

Figure 1:
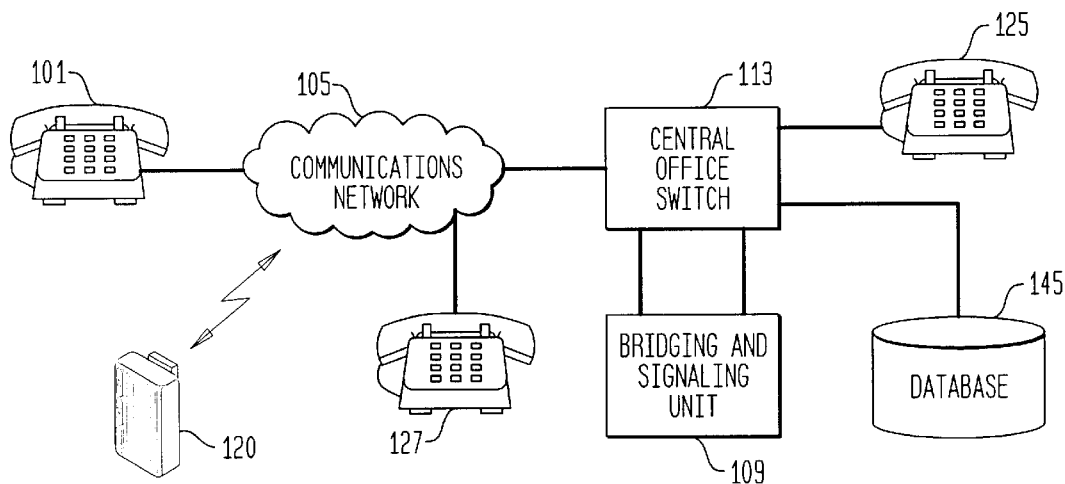
FIG. 1 illustrates a system providing telecommunications services in accordance with a first embodiment of the present invention.

FIG. 1 illustrates a system 100 for providing telecommunication services in accordance with this embodiment of the present invention. Here, the caller uses telephone 101 to call the telephone number of telephone 125 (i.e., the telephone of the party under surveillance). The call is routed via a communications network 105 in a traditional manner. Even through the incoming call is routed in a conventional manner, it is treated differently when it is received at destination central office switch. When the incoming call intended for telephone 125 is received by destination central office switch 113, central office switch 113 forwards the call to bridging and signaling unit 109. Bridging and signaling unit 109 routes the call via an assigned "meet-me" bridge. The call is then connected to its intended destination (i.e., telephone 125).

Destination central office switch 113 is also programmed to recognize an incoming call to telephone 125 and to immediately alert the third party. To accomplish this, the destination central office switch 113 automatically generates a page to pager 120 (i.e., pager of the third party). This page is transmitted to pager 120 via communications network 105. The third party is supplied with the telephone number corresponding to the assigned meet-me bridge via a page transmitted to pager 120.

The third party receives the page and uses an exemplary telephone 127 to place a call to the assigned meet-me bridge. When the third party (e.g., via telephone 127) places a call to the telephone number of the assigned meet-me bridge, the call is forwarded to the meet-me bridge by communications network 105 in a conventional manner. At the meet-me bridge, the third party is thereby connected to the call-in-progress between the caller and the called party. With the aid of database 145, the third party is also automatically placed on mute. Thereon, the third party may listen to the conversation between the caller and the called party.

The principles of the invention are flexible, and may be practiced in a variety of situations, e.g., even though telephone 101 and telephone 127 are shown as call-originating points, but in practice, any telephone connected to communications network 105 may be used to place the call to the called party as well to place the call to the assigned bridge. Furthermore, the originating telephone and the destination may be served by the same central office switch. In this situation the call may be connected without utilizing remaining portions of the communications network.

The system of FIG. 1 may also be used if the party under surveillance originates a call. For example, if a call is originated from telephone 125, central office switch 113 detects the call via bridging and signaling unit 109. Bridging and signaling unit 109 assigns a meet-me bridge for the outgoing call. Thereon, the outgoing call is connected to its intended destination, and the third party is provided with the corresponding number of the assigned bridge via a pager. When the third party places a call to the assigned bridge, the third party is automatically connected to the outgoing call. The third party may silently listen to the conversation between the called party and the calling party under surveillance.

FIG. 2 shows a flow chart of an exemplary process for the embodiment of FIG. 1 wherein when a telephone call is placed to the telephone number of a called party under surveillance, a third party is notified by a pager. The third party is also provided with an option to silently listen to the call in progress.

The process begins in step 201 when a caller dials the called individual's personal telephone number. Communications network 105 routes the call and the call reaches destination central office switch 113 (step 203). Destination central office 113 switch forwards the call to bridging and signaling unit 109 in step 205.

In step 207, bridging and signaling unit 109 routes the call via an assigned meet-me bridge. In step 209, destination central office switch 113 supplies the ringback tone the called number (i.e., connects the call between the called party and the calling party).

Next, in step 211, destination central office switch 113 sends a page to telecommunications network 105 to be broadcasted to the pager 120. The paging information to be transmitted includes the predetermined code of the pager of the third party, and the telephone number of the assigned "meet-me" bridge to which a call is to be placed.

The control then passes to conditional branch point 213, wherein destination central office switch 113 tests to determine if a call has been received from the third party. As the call from the third party is intended for an assigned meet-me bridge associated with bridging and signaling unit 109, the testing step may be performed at destination central office switch 113. Thus, the third party may use any telephone to place the call to the assigned meet-me bridge, the call will be routed to destination central office switch 113.

If the test result in step 213 is YES, control passes to conditional branch point 215, in which the bridging and signal unit 109 tests to determine if the caller's telephone call is still in progress. If the test result is YES, destination central office switch 113 interconnects the call from the third party to the telephone call in progress in step 217. With the help of database 145, the third party is automatically placed on mute. Thereon, the third party may silently listen to the call in progress.

If the answer in conditional branch point 215 is NO implying that the caller's call in progress has been disconnected (i.e., call is over), the third party is sent a disconnect signal to indicate that the third party can no longer be connected to the call (step 219).

If the test result in step 213 is NO, control passes to step 221 which tests to determine if a pre-determined time-out period in which the call must be placed has expired. If the test result in step 221 is YES, destination central office switch 113 sends a disconnect signal to the third party in step 223 implying that the third party cannot be connected to the call in progress. If the test result in step 221 is NO, the process returns to step 213 to see if the call from the third party has been received.

Generally, the third party is provided with ample time to place a call and join the call in progress. But, the time-out period may be based on the duration of the call in progress, e.g., the time-out period may be made to be equal to the duration of the call. In this case, if the call in progress is over before a call from the third party is received, a disconnect signal is sent to the third party.

The principles of the present invention as described in FIG. 1 and FIG. 2 provide a low cost solution for monitoring an incoming call to a telephone. Unlike the prior art, no tap is required. When an incoming call is received at the telephone number of the party under surveillance, an third party is alerted via a pager. The third party is also provided with an option to join the call-in-progress and silently listen to the call.

In a second embodiment, a dual-alerting paging system capable of monitoring a return call is disclosed. In this embodiment, the system is configured to detect calls placed to the telephone number associated with a pager of the party under surveillance by a third party. After receiving the page, when the party under surveillance utilizes a known calling card number to place a return call, the third party is alerted. The third party is also provided with an option to silently listen to the conversation.

Figure 3:
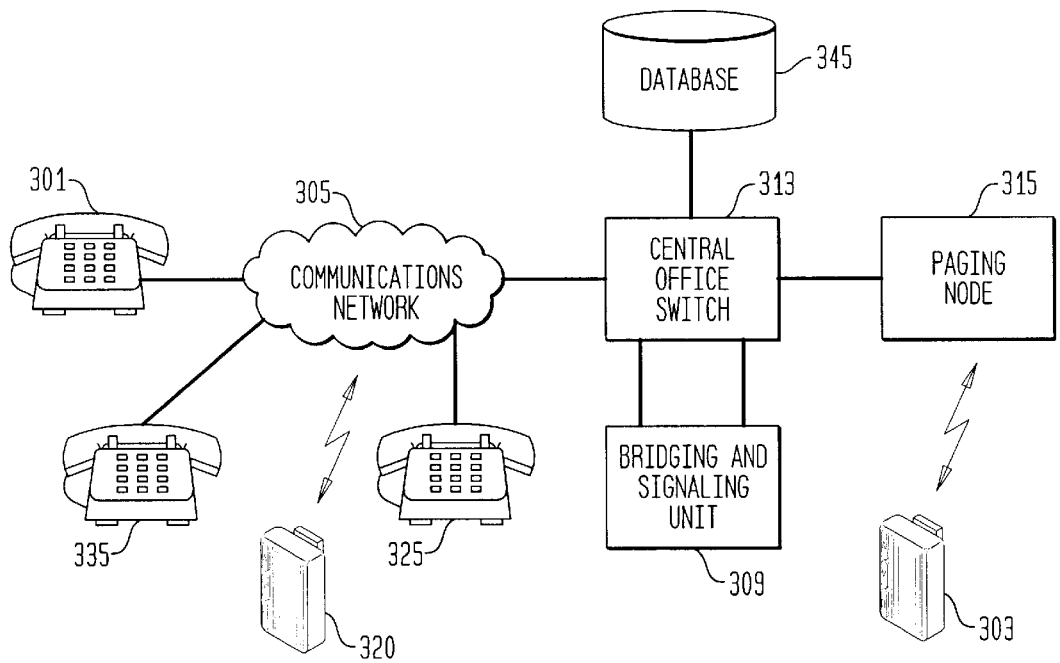
FIG. 3 illustrates another system providing telecommunications service in accordance with a second embodiment of the present invention.

FIG. 3 shows a system 300 for providing telecommunications services in accordance with a second embodiment of the present invention. In this embodiment, a telephone 301 is used by a caller to call the telephone number of a pager 303 (i.e., the pager owned by the called party under surveillance). A third party is shown to have a pager 320.

When the caller places a telephone call from telephone 301 to the telephone number associated with pager 303, the caller's telephone call is routed via a communications network 305, and the call arrives at a destination central office switch 313.

Communications network 305 is a conventional telecommunication network configured to handle calls, e.g. communications network may be a mixture of local central office switches and inter-exchange carries. Furthermore, communications network 305 may empty toll switches. In one example, the originating and designation central offices may be the same and the incoming call would reach the destination central office switch without passing through the remaining portions of the communications network The telephone number associated with pager 303 may be a translatable number, e.g., 800-type of telephone number. An advantage of using an 800-type of telephone number is that it allows the user of pager 303 to place the return telephone call without having information about the area code of the telephone line which he is using. This is because calls to 800-type telephone numbers are unlike calls to conventional telephone numbers. Telephone calls to conventional telephone numbers employ the area code for routing purposes. Such calls require the explicit dialing of the area code of the destination location for calls placed from one area code to another and generally, that no area code be dialed for telephone calls placed within a single area code. However 800-type telephone numbers employ the 800 area code to indicate that the telephone network should translate the telephone number to its corresponding destination location. As such, the 800 area code must be dialed for such telephone network, even if the destination location is within the same area code as the location of the caller.

Upon receipt of the caller's telephone call to pager 303 associated with the party under surveillance, destination central office switch 313 forwards to paging node 315 paging information including a predetermined code that uniquely identifies pager 303. Paging node 315 causes a paging signal containing the paging information to be broadcasted to pager 303. Destination central office switch also causes an alerting signal to be broadcasted to the pager of the third party. Depending upon where pager 320 is located, the page is routed via communications network 305 to the current location of pager 320.

In response to the activation of pager 303, the user of pager 303 (i.e., the party under surveillance) utilizes a calling card to place a return telephone call to the original caller. In FIG. 3, the return call is shown to be placed from a telephone 325. In practice, the return call may be placed from any telephone including a cellular telephone. The system of the present invention is configured to identify the particular number associated with the calling card of the party under surveillance. Accordingly, communications network 305 recognizes the return call and forwards the return call to a bridging and signaling unit 309 associated with central office switch 313. Bridging and signaling unit 309 routes the return call via an assigned "meet-me" bridge. Thereon, the return call is connected to the intended destination by communications network 305.

Central office switch 313 then forwards a unique identifying code for the "meet-me" bridge to communications network 305 to be transmitted to pager 320. Pager 320 receives the paging signal containing the identity of the assigned meet-me bridge. The user of pager 320 (i.e., the third party) accordingly places a call from telephone 335 to the particular telephone number (i.e., the unique telephone number of the assigned meet-me bridge) specified in the page. In FIG. 3, the third party is shown to utilize telephone 335 to place a call to the assigned meet-me bridge, but in practice any telephone may be used, including a cellular telephone.

Communications network 305 receives the call from the third party and routes it to central office switch 313 so that it can be forwarded to the "meet-me" bridge of bridging and signaling unit 309. Thereon, the call from the third party is bridged to the return call placed by the user of pager 303 to the original caller. Once the call from the third party is bridged, the third party (i.e., user of pager 320) may listen to the return call in progress between the original called party under surveillance user (i.e., user of pager 303) and the original caller who initiated the page. The call from the third party is automatically muted with the aid of database 345 so that the actual call may remain in progress without any interruptions.

It is noted that telephone 325 or telephone 335 may be a mobile base telephone. If so, a mobile telephone switching office (MTSO) may be employed to assist in routing the return call.

Figure 4A:
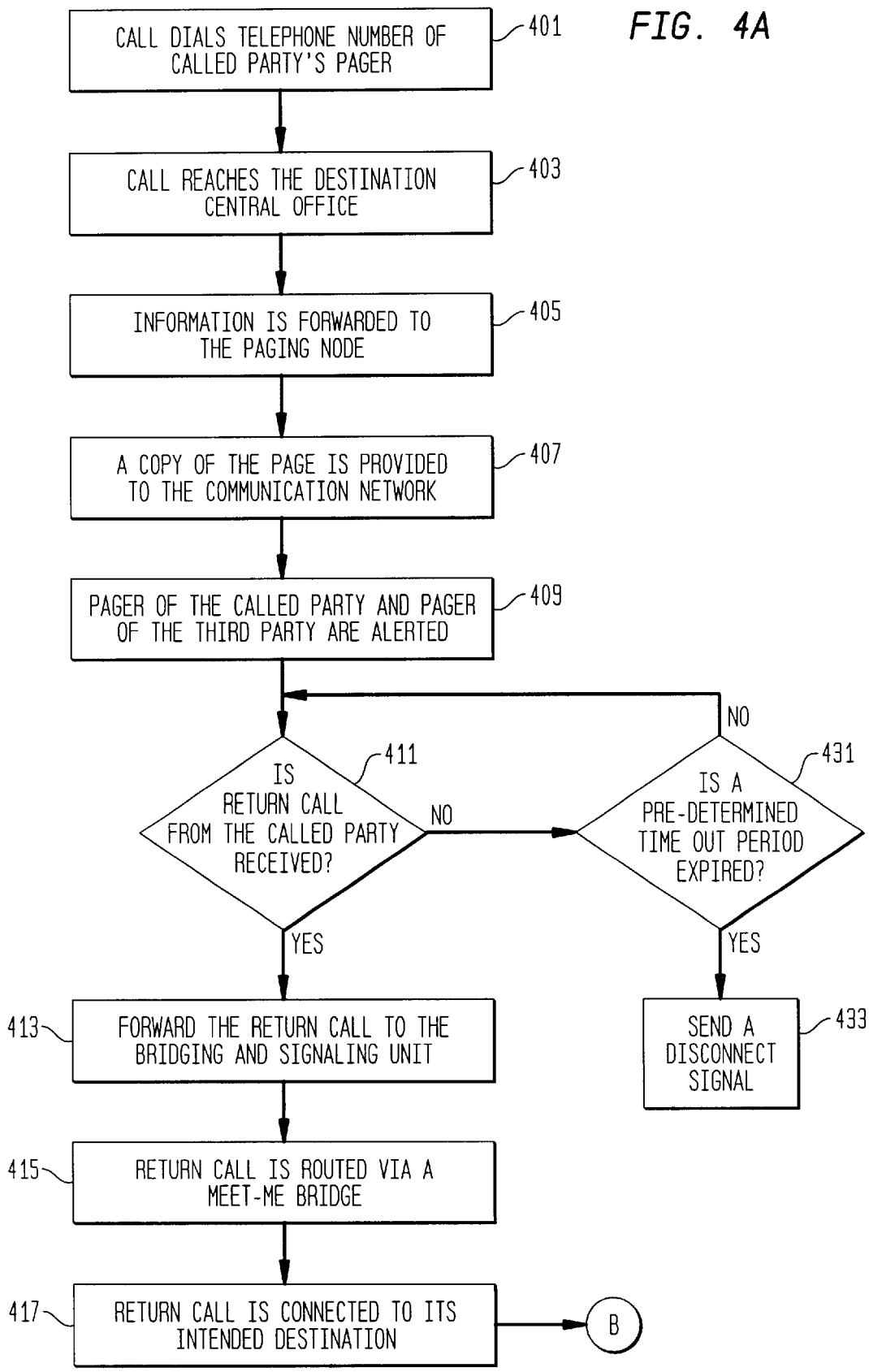
FIGS. 4A and 4B illustrates a flow chart of an exemplary process of the second embodiment.
Figure 4B:
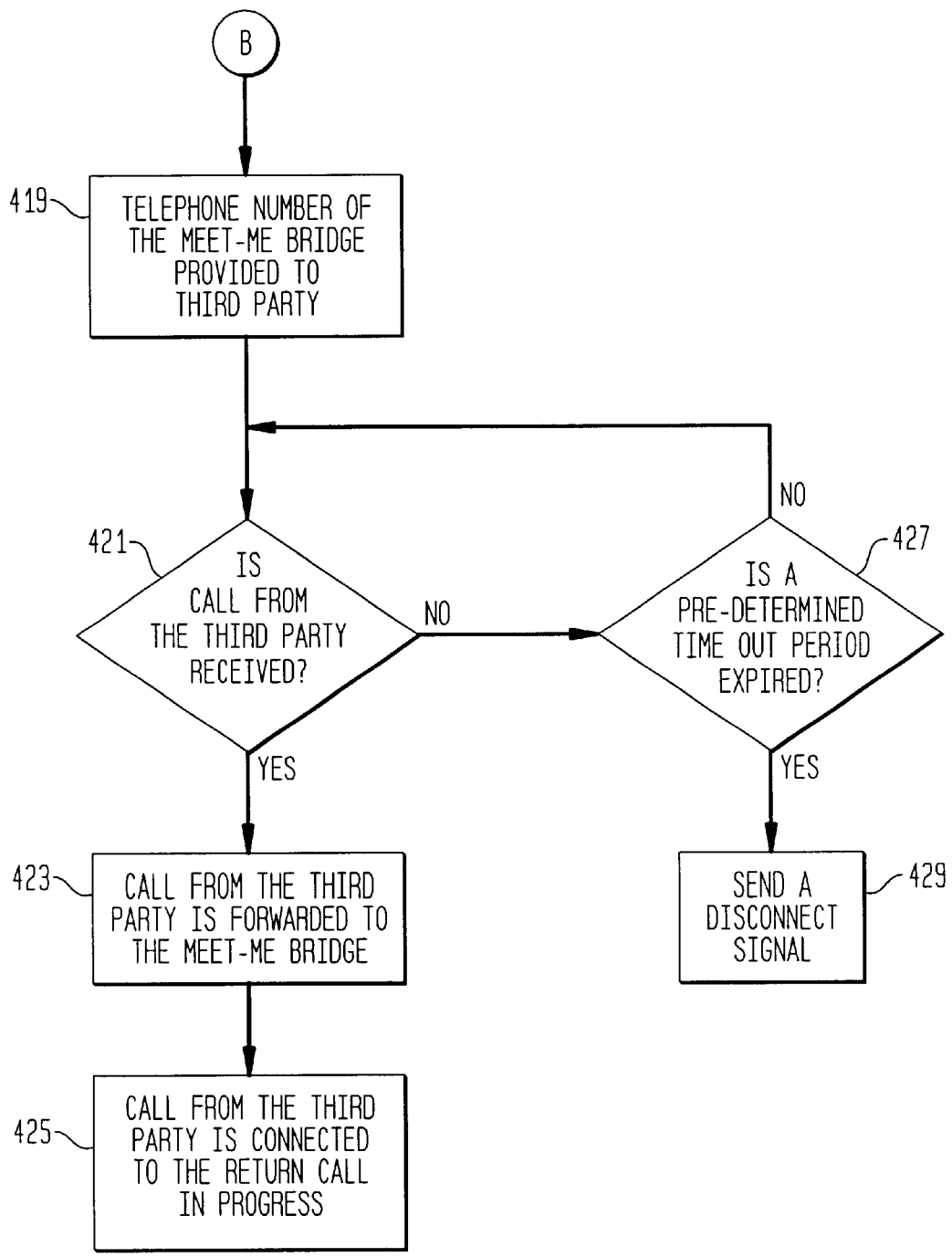

FIGS. 4A and 4B illustrate a flow chart of an exemplary process for the embodiment of FIG. 3 wherein a dual-altering of an incoming page to a pager associated with a party under surveillance is provided.

The process begins in step 401 when a caller uses telephone 301 to dial the telephone number associated with pager 303. Thereafter, in step 403, communications network 305 routes the call and the call arrives at destination central office switch 313. Central office switch 313 supplies the called number and the paging information to paging node 315 to be broadcasted to pager 303 (step 405). The paging information includes the predetermined code of the called pager and the actual paging information. Generally, the caller will include the corresponding telephone number of telephone 301 in the outgoing page so that return call may be received at the telephone 301, but the caller may also designate some other telephone number to receive the return call. Central office switch 313 also makes a copy of the incoming page and provides this copied information to communications network 305 to be transmitted to pager 320 (step 407). Next, in step 409, the paging information is transmitted to pager 303 and pager 320.

The process then moves to conditional branch point 411, which tests to determine if the return call from the user of pager 303 has been received. This return call is recognized by the system by identifying the unique number associated with the calling card owned by the party under surveillance (i.e., the user of pager 303). The principles of the invention assume that the calling card number of the party under surveillance is known to the third party, and the system of the present invention is configured to detect the unique numbers associated with the calling card. If the test result in step 413 is YES, the return call is forwarded to the bridging and signaling unit 309 (step 415). Bridging and signaling unit 309 routes the return call via a "meet-me" bridge having a unique telephone number (step 415). The return call is then connected to the intended telephone which may be telephone 301 by telecommunications network 305 (step 417). The process of routing the return call via an assigned meet-me bridge is transparent to the user of pager 303. Next, central office switch 313 transmits the telephone number of the assigned meet-me bridge to telecommunications network so that it can be transmitted to the third party (step 419).

Next, the process moves to conditional branch pont 421 to see if a call from the third party (i.e., user of pager 320) targeted for the assigned meet-me bridge is received. If the answer in conditional branch point 421 is YES, next, in step 423, the call from the third party is forwarded to the assigned "meet-me" bridge wherein the third party is interconnected to the return call in progress. The call from the third party is automatically muted with the aid of database 345 and at this point the third party may silently listen to the conversation in progress (step 425).

If the answer in conditional branch point 421 is NO, the process returns to a conditional branch point 427 to determine whether a pre-determined time-out period in which the call from the third party should be received has expired. If YES, a disconnect signal is sent to the third party in step 429 implying that the third party can not be connected to the return call. If the answer in conditional branch point 427 is NO, the process returns to conditional branch 421 to once again check the call from the third party.

If in conditional branch 411, the answer is NO implying that the party under surveillance has not returned the page (i.e., placed a return call), the process moves once to decision function in step 431 to determine whether a pre-determined time-out period has expired. If YES, the process ends in step 433 by sending a disconnect signal implying that the third party cannot be connected to the return call because the return call wasn't placed in a pre-determined time period. If answer in step 431 is NO, the process returns to decision function 411 and once again checks for the return call.

Generally, the party under surveillance is provided with ample time to place the return call; however, the pre-determined time-out period ensures that the network resources are not tied up unnecessarily and that not every call placed by the party under surveillance is routed via a meet-me bridge. A call placed within a pre-determined period after receiving the page is considered a return call and is monitored.

The principles of the invention as described in FIG. 3 and FIG. 4 provide a low-cost solution for monitoring incoming pages to a pager. As tap to the telephone line is not required, the solution can be used to monitor one or more pagers at one time.

The above-described embodiments are only few embodiments of the present invention. It will be further understood that various changes in the details, materials, and arrangements of the parts which have been described and illustrated in order to explain the nature of this invention may be made by those skilled in the art without departing from the scope of the invention as expressed in the following claims.

What claimed is:

1. A method for monitoring a first party under surveillance, comprising the steps of:
   (a) detecting access to telecommunications equipment corresponding to the first party;
   (b) routing a telephone call between the first party and a second party via a bridge;
   (c) automatically generating a paging message to a third party to alert the third party about the access, wherein the paging message identifies a telephone number corresponding to the bridge;
   (d) receiving a telephone call from the third party to be connected to the bridge; and
   (e) connecting the telephone call from the third party to the bridge to enable the third party to hear the telephone call between the first and second parties.

2. The invention of claim 1, wherein:
   step (a) comprises the step of detecting an incoming telephone call from the second party to a telephone of the first party; and
   step (b) comprises the step of routing the incoming call to the telephone of the first party via the bridge.

3. The invention of claim 1, wherein:
   step (a) comprises the step of detecting an outgoing telephone call from a telephone of the first party to the second party; and
   step (b) comprises the step of routing the outgoing call to the second party via the bridge.

4. The invention of claim 1, wherein step (a) comprises the step of detecting an incoming paging message from the second party to a pager of the first party.

5. The invention of claim, 4 wherein:
   step (a) further comprises the step of detecting an outgoing call from the first party; and
   step (b) comprises the step of routing the outgoing call via the bridge.

6. The invention of claim 5, wherein the outgoing call from the first party is a calling card call and step (a) further comprises the step of detecting the number corresponding to the calling card of the first party.

7. The invention of claim 5 wherein the outgoing call is routed via the bridge if the outgoing call is placed within a specified time period after the incoming paging message from the second party to the pager of the first party.

\* \* \* \* \*